United States Patent
Hermann

(10) Patent No.: US 8,445,126 B2
(45) Date of Patent: May 21, 2013

(54) HAZARD MITIGATION WITHIN A BATTERY PACK USING METAL-AIR CELLS

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 151 days.

(21) Appl. No.: 13/027,059

(22) Filed: Feb. 14, 2011

(65) Prior Publication Data

US 2012/0040212 A1    Feb. 16, 2012

Related U.S. Application Data

(63) Continuation of application No. 13/027,018, filed on Feb. 14, 2011.

(60) Provisional application No. 61/372,351, filed on Aug. 10, 2010.

(51) Int. Cl.
*H01M 10/50* (2006.01)

(52) U.S. Cl.
USPC .................................. 429/9; 429/61; 429/62

(58) Field of Classification Search
USPC .................................. 429/62, 9, 61
See application file for complete search history.

(56) References Cited

U.S. PATENT DOCUMENTS 7,482,081 B2 * 1/2009 Hong .......................... 429/404
2007/0212596 A1 * 9/2007 Nebrigic et al. ................ 429/61

* cited by examiner

*Primary Examiner* — Ula C Ruddock
*Assistant Examiner* — Frank Chernow
(74) *Attorney, Agent, or Firm* — Patent Law Office of David G. Beck

(57) ABSTRACT

A system and method for mitigating the effects of a thermal event within a battery pack is provided in which the hot gas and material generated during the thermal runaway of at least one non-metal-air cell of a plurality of non-metal-air cells is directed through one or more metal-air cells, the metal-air cells absorbing at least a portion of the thermal energy generated during the event before it is released to the ambient environment. As a result, the risks to vehicle passengers, bystanders, first responders and property are limited.

4 Claims, 7 Drawing Sheets

HAZARD MITIGATION WITHIN A BATTERY PACK USING METAL-AIR CELLS

CROSS-REFERENCE TO RELATED APPLICATION

This application is a continuation of U.S. patent application Ser. No. 13/027,018, filed Feb. 14, 2011, and claims benefit of the filing date of U.S. Provisional Patent Application Ser. No. 61/372,351, filed Aug. 10, 2010, the disclosures of which are incorporated herein by reference for any and all purposes.

FIELD OF THE INVENTION

The present invention relates generally to batteries and, more particularly, to means for mitigating the effects and hazards associated with a battery pack thermal event.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure. While the safety pressure release vent built into many cells may help to release some of the gas generated by the reaction, eventually the increased temperature in concert with the increased internal cell pressure will lead to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and to lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to the vehicle's passengers leaving the vehicle, or to first responders attempting to control the event, becomes quite significant.

Accordingly, it is desirable to delay the escape of hot gas from the cell or cells undergoing thermal runaway to the ambient environment as long as possible. Similarly, it is desirable to lower the temperature of the hot gas before it reaches the ambient environment, thereby further lowering the risks to passengers, bystanders and first responders, as well as reducing the potential for the spontaneous combustion of materials in proximity to the event. The present invention provides a system and method for achieving these goals, thereby limiting collateral damage and the risk to first responders and others.

SUMMARY OF THE INVENTION

The present invention provides a system and method for mitigating the effects of a thermal event within a battery pack, the battery pack including both non-metal-air cells and metal-air cells. In accordance with the invention, the hot gas and material generated during the event is directed through the metal-air cells, the metal-air cells providing a large thermal mass for absorbing at least a portion of the generated thermal energy before it is released to the ambient environment, thereby lowering the risk to vehicle passengers, bystanders and first responders as well as limiting collateral property damage.

In at least one embodiment of the invention, a battery pack with an integrated hazard mitigation system is disclosed that includes a plurality of metal-air cells, a plurality of non-metal-air cells, a first air passageway, a second air passageway, and a first valve, the first valve controlling air flow through said first air passageway, wherein the first valve is configured to switch from a first, open position to a second, closed position when a thermal event occurs within at least one of the plurality of non-metal-air cells, thereby causing effluent generated by the thermal event to pass through the plurality of metal-air cells before passing through the second air passageway. The first valve may switch from the first, open position to the second, closed position when a preset temperature is reached, for example as monitored by at least one temperature sensor within the battery pack, or when a preset pressure is reached, for example as monitored by at least one pressure sensor within the battery pack. The battery pack may further include a system controller coupled to the first valve, the system controller monitoring conditions and controlling operation of the first valve. The battery pack may include a second valve that controls air flow through the second air passageway, wherein the second valve is configured to switch to a second, closed position upon the occurrence of the thermal event, and switch from the second, closed position to a first, open position at a preset temperature or pressure. The battery pack may include a second valve that controls air flow through the second air passageway, at least one temperature sensor within the battery pack, and a system controller coupled to the first and second valves and the temperature sensor, wherein the system controller switches the first valve from a first, open position to a second, closed position when a first preset temperature is exceeded, switches the second valve from a first, open position to a second, closed position when the first preset temperature is exceeded and the monitored temperature is less than a second preset temperature, and switches the second valve from the second, closed position to the first, open position when the first and second preset temperatures are exceeded. The battery pack may include a second valve that controls air flow through the second air passageway, at least one pressure sensor within the battery pack, and a system controller coupled to the first and second valves and the pressure sensor, wherein the system controller switches the first valve from a first, open position to a second, closed position when a first preset pressure is exceeded, switches the second valve from a first, open position to a second, closed position when the first preset pressure is exceeded and the monitored pressure is less than a second preset pressure, and switches the second valve from the second, closed position to the first, open position when the first and second preset pressures are exceeded. The battery pack may include a second valve that controls air flow through the second air passageway, at least one temperature sensor and at least one pressure sensor within the battery pack, and a system controller coupled to the first and second valves and the temperature and pressure sensors, wherein the system controller switches the first valve from a first, open position to a second, closed position when a preset temperature is exceeded, switches the second valve from a first, open position to a second, closed position when the preset temperature is exceeded and the monitored pressure is less than a preset pressure, and switches the second valve from the second, closed position to the first, open position when the preset temperature and the preset pressure are both exceeded. The battery pack may include a second valve that controls air flow through the second air passageway, at least one temperature sensor and at least one pressure sensor within the battery pack, and a system controller coupled to the first and second valves and the temperature and pressure sensors, wherein the system controller switches the first valve from a first, open position to a second, closed position when a preset pressure is exceeded, switches the second valve from a first, open position to a second, closed position when the preset pressure is exceeded and the monitored temperature is less than a preset temperature, and switches the second valve from the second, closed position to the first, open position when the preset temperature and the preset pressure are both exceeded. The battery pack may further include a high pressure relief valve.

In at least one other embodiment of the invention, a method of mitigating the effects of a thermal event within a battery pack is disclosed, the battery pack including a plurality of non-metal-air cells and a plurality of metal-air cells, the method including the steps of closing a first valve that controls air flow into the battery pack through a first air passageway upon the occurrence of the thermal event within at least one of the non-metal-air cells, and directing effluent generated by the thermal event through at least a portion of the metal-air cells upon the occurrence of the thermal event. The step of closing the first valve may be performed when a temperature within the battery pack exceeds a preset temperature or when a pressure within the battery pack exceeds a preset pressure. The method may further include the steps of closing a second valve that controls air flow out of the battery pack upon the occurrence of the thermal event and opening the second valve when the temperature within the battery pack exceeds a preset temperature or when the pressure within the battery pack exceeds a preset pressure.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably. The term "battery pack" as used herein refers to one or more individual batteries that are electrically interconnected to achieve the desired voltage and capacity for a particular application. The individual batteries of a battery pack are typically contained within a single piece or multi-piece housing, although it is possible to include multiple battery packs within a single piece or multi-piece housing as described below. The term "electric vehicle" as used herein refers to an all-electric vehicle, also referred to as an EV, a plug-in hybrid vehicle, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Secondary cells may utilize any of a variety of different cell chemistries. As used herein, a 'conventional' cell or 'conventional cell chemistry' refers to a cell that utilizes lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or similar battery chemistry. In contrast and as used herein, a 'metal-air cell' refers to a cell that utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Figure 1:
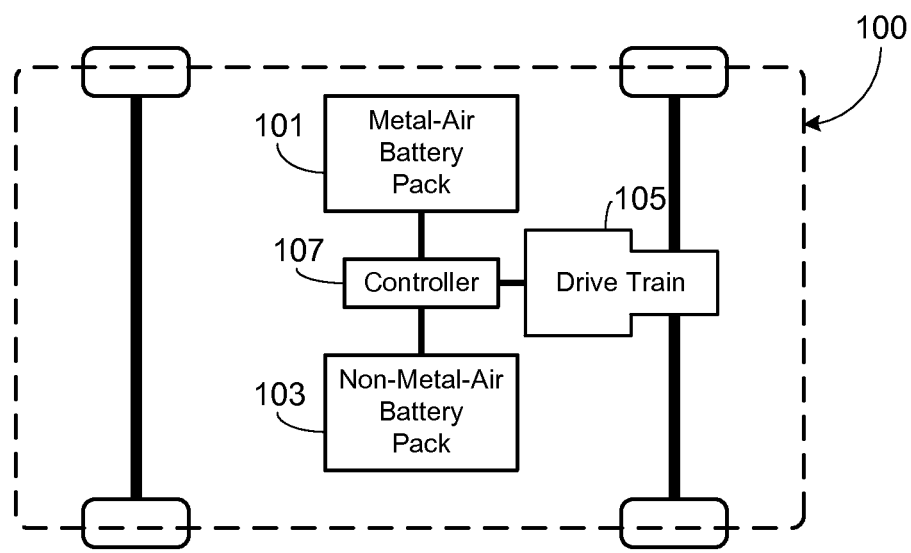
FIG. 1 illustrates the primary components of an electric vehicle that utilizes both a metal-air battery pack and a conventional battery pack.

Due to the use of oxygen as one of the reactants, metal-air cells offer a number of advantages over a conventional rechargeable battery, most notably their high energy density and high capacity-to-volume, or capacity-to-weight, ratio. Given these advantages, they are well suited for use in electric vehicles, especially in a dual source configuration in which one or more metal-air battery packs are used in conjunction with one or more conventional battery packs (e.g., lithium ion battery pack(s)). This configuration is illustrated in FIG. 1 which shows the primary components of an EV 100 that utilizes both a metal-air battery pack 101 and a conventional, non-metal-air battery pack 103. As previously noted, as used herein metal-air batteries refer to any cell that utilizes oxygen as one of the electrodes and metal (e.g., zinc, aluminum, magnesium, iron, lithium, vanadium, etc.) in the construction of the other electrode. Conventional battery pack 103 utilizes non-metal-air cells, and preferably ones that provide high power density, thus providing a combined power source that achieves an optimal combination of energy and power. Exemplary batteries used in conventional battery pack 103 include, but are not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, etc. In a preferred application, battery packs 101 and 103 are coupled to one or more drive motors 105 that provide propulsion to one or more wheels of EV 100. A controller 107 optimizes the vehicle's dual power source, i.e., battery packs 101 and 103, in light of the current battery pack conditions (e.g., state-of-charge, temperature, etc.), preferred battery pack charge/discharge conditions, and the various operating conditions. Exemplary operating conditions include those placed on the system by the user (e.g., distance, speed, acceleration, etc.), road conditions (e.g., uphill, downhill, traffic, etc.), charging system (e.g., available power, available time for charging, etc.), and environmental conditions (e.g., ambient temperature, humidity, etc.).

The gas communication system disclosed herein may be used to mitigate the effects of one or more cells within a conventional battery pack undergoing thermal runaway, or undergoing a similar thermal event. FIGS. 2-5 schematically illustrate the basic operation of the hazard mitigation system of the present invention. It should be understood that these figures, as well as those that follow, are intended to illustrate the operation of the invention, and therefore do not show other aspects of a system utilizing the disclosed dual power source. For example, these figures do not show the power electronics, control system, and drive train components that would be necessary to use the dual power source in an electric vehicle, as previously illustrated in FIG. 1. It will be appreciated, however, that the inventors envision the use of the dual power source with the disclosed hazard mitigation system within an electric vehicle (i.e., EV, PHEV, HEV, etc.) as well as other applications.

Figure 2:
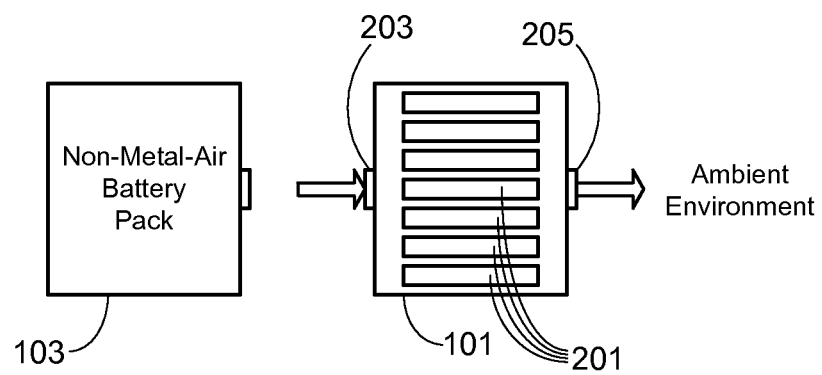
FIG. 2 illustrates the basic elements of a hazard mitigation system in accordance with the invention, the figure showing operation of the battery packs during a normal operational period.

In accordance with the invention, during normal use, e.g., during normal vehicle operation, metal-air battery pack 101 and conventional battery pack 103 operate in a manner consistent with a conventional dual power source system. As such, power may be drawn from one or both battery packs 101 and 103, depending upon current battery pack conditions (e.g., state-of-charge (SOC), temperature, etc.) and system needs (e.g., vehicle needs such as speed, acceleration, road conditions, etc.). FIG. 2 illustrates operation of the battery packs during this normal operational period. As shown, preferably conventional battery pack 103 (also referred to herein as the non-metal-air battery pack) is sealed from the ambient environment. Metal-air battery pack 101 is necessarily open to the ambient environment as the metal-air cells within metal-air battery pack 101 require oxygen, for example taken from the ambient atmosphere, since oxygen is one of the reactants and therefore is necessary in order for the cells to discharge. Battery pack 101 also requires a volume, such as the ambient environment or a container system, during the charge cycle when oxygen-rich effluent is generated. Due to the requirement for oxygen during operation, typically all of the metal-air cells within metal-air battery pack 101 are provided with equal access to the air flow. For example, in the exemplary system shown in FIG. 2, metal-air cells 201 are shown positioned in parallel relative to air passageways 203 and 205. In this configuration, either passageway may be used as an inlet, leaving the other passageway to operate as an air outlet. Other approaches may be used to insure sufficient air flow to each of the metal-air cells within pack 101. For example, air may be forced through a plenum that is used to feed the entering air to each of the cells. It will be appreciated that the present invention is not limited to a specific metal-air cell configuration within battery pack 101, as long as the metal-air cells are provided with sufficient access to oxygen, thus ensuring proper operation.

Figure 3:
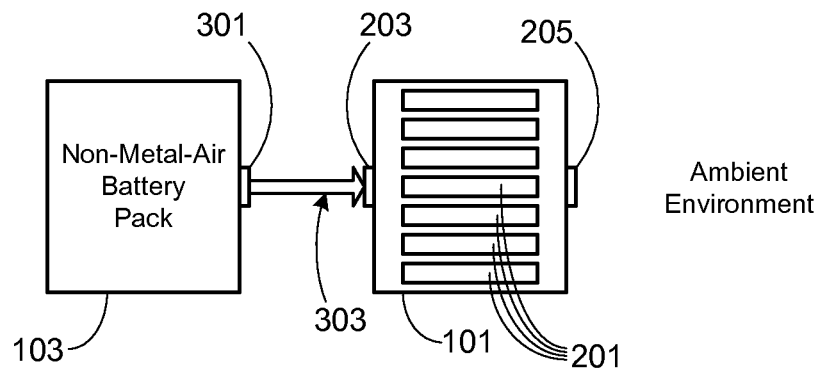
FIG. 3 provides the same hazard mitigation system shown in FIG. 2, modified to show operation when one or more non-metal-air cells enter into thermal runaway.

FIG. 3 illustrates the next stage of operation, when a cell or cells within the non-metal-air battery pack 103 enter into thermal runaway. At this stage, a valve 301 corresponding to conventional battery pack 103 opens. As noted in more detail below, valve 301 may be a pressure valve that opens when the pressure within battery pack 103 exceeds a preset pressure limit. Alternately, valve 301 may open when the temperature within battery pack 103 exceeds a preset temperature. Alternately, valve 301 may be under the control of a system controller that determines when to open valve 301, for example by monitoring pressure and/or temperature within battery pack 103. Note that valve 301 may be a simple open/close valve, or may open in stages, for example depending upon the pressure and/or temperature within pack 103. Once valve 301 opens, the hot gas and material generated during the non-metal-air cell(s) thermal runaway event escapes from pack 103 and is directed into metal-air battery pack 101, and through the metal-air cells 201, as illustrated. Note that as the purpose of the invention is to mitigate hazards by delaying the hot gas generated during the event from reaching the ambient atmosphere, preferably the pathway 303 that couples the two battery packs is sealed to prevent, or at least minimize, the hot gas exiting from pack 103 from coming into contact with the ambient environment. Various ways of sealing this passageway are described more fully below.

Figure 4:
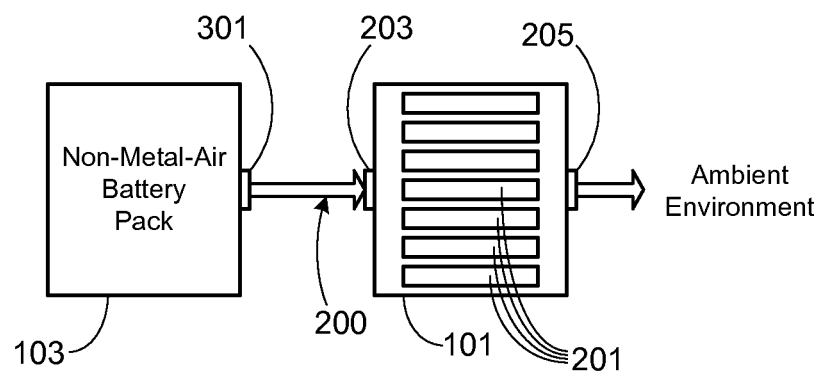
FIG. 4 provides the same hazard mitigation system shown in FIG. 2, modified to show operation as the pressure within the metal-air battery pack exceeds a preset level.

In addition to forming a pathway between the non-metal-air battery pack 103 and the metal-air battery pack 101 during this stage, preferably outlets (e.g., passageway 205) from the metal-air battery pack are closed. Once the pressure becomes great enough, and as illustrated in FIG. 4, valve 205 is opened. Opening valve 205 allows the hot gas escaping from conventional battery pack 103 to pass completely through metal-air battery pack 101. Depending upon the size of the thermal event, as well as the thermal mass of the metal-air cells 201 within metal-air pack 101, potentially the temperature of the hot gas passing through the metal-air pack has been sufficiently lowered to eliminate, or greatly reduce, the risk of spontaneous combustion.

Figure 5:
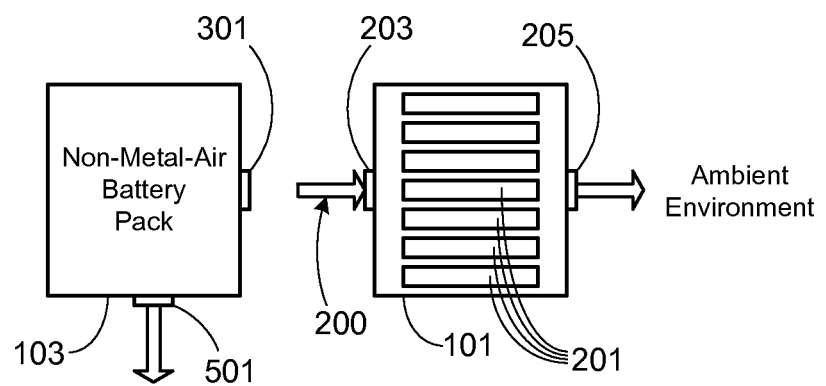
FIG. 5 provides the same hazard mitigation system shown in FIG. 2, modified to show operation of a secondary high pressure relief valve.

In a typical configuration, the hot gas and material generated during the thermal event will eventually clog the pores of the porous metal electrodes of metal-air cells 301. Accordingly, in the preferred embodiments of the invention, at least one secondary high pressure relief valve 501 is included in battery pack 103 as shown in FIG. 5. The preset relief pressure for valve 501 is set at a much higher value than that of valve 301. The purpose of valve 501 is to provide a means for relieving the pressure within conventional battery pack 103 once the hot gas generated during the thermal event is no longer able to pass through the metal-air cells 301 of metal-air pack 101 and the pressure within the system begins to raise to an undesirable level.

As previously noted, the present invention is not limited to a specific configuration for battery packs 101 and 103 as long as the necessary air flow requirements of the invention can be met by the selected configuration. For example, in the embodiment shown in FIG. 6, a single battery pack 601 is used, this battery pack including both metal-air battery pack 101 and non-metal-air battery pack 103. Note that as used in this configuration, battery packs 101 and 103 refer to groups of cells and as such, the groups of cells may or may not be contained within enclosures that are distinct from the enclosure of battery pack 601. In system 600, the groups of cells are not contained within distinct enclosures and therefore metal-air battery pack 101, containing metal-air cells 603, and non-metal-air battery pack 103, containing non-metal-air cells 605, are shown in phantom. If cells 603 and 605 are not contained within separate enclosures, the system may or may not utilize a separation barrier between the cell types. A separation barrier may be used, for example, to control heat flow or air flow between cell types during normal battery operation. In the embodiment illustrated in FIG. 6, no separation barrier is used.

In system 600, pack 601 includes at least a pair of passageways 607 and 609 that allow air to flow into and out of pack 601. The flow of air through passageways 607 and 609 is preferably controlled by valves 608 and 610, respectively. It will be appreciated that while passageways 607 and 609 are shown as singular passageways, each of them may be comprised of multiple passageways in order to provide sufficient air flow, and therefore oxygen, for metal-air cells 603. During a thermal event, passageway 609 is closed (e.g., using valve 610), forcing the hot gas and material generated by one or more non-metal-air cells 605 undergoing thermal runaway to pass through metal-air cells 603 before being expelled through passageway 607. In some embodiments passageway 607 is closed (e.g., using valve 608) during the initial stages of the thermal event, thus delaying the escape of hot gas to the ambient atmosphere. Typically passageway 607 is opened soon after initiation of thermal runaway, thus ensuring that the hot gas passes through metal-air cells 603. Alternately, passageway 607 may be opened only a small amount during the early stages of the event, sufficient to direct the flow of hot gas through the metal-air cells while still limiting airflow out of the pack. As noted above, preferably battery pack 601 includes a secondary high pressure relief valve 611 to avoid over-pressuring pack 601 once the pores of the porous metal electrodes of the metal-air cells 603 become clogged.

Figure 7:
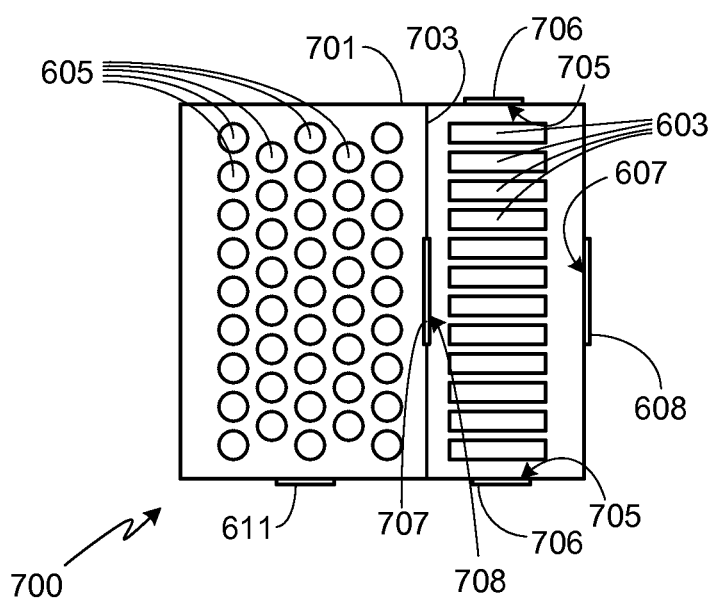
FIG. 7 illustrates a modification of the embodiment shown in FIG. 6 in which a barrier separates the non-metal-air cells from the metal-air cells.

FIG. 7 illustrates a slight modification of system 600. As shown, within battery pack 701, metal-air cells 603 are separated from non-metal-air cells 605 by barrier 703. Barrier 703 prevents the flow of air between the two sets of cell. Accordingly, during normal operation air flows into the portion of battery pack 701 containing metal-air cells 603 through one or more passageways 607, and then out of this portion of the battery pack via one or more passageways 705. Typically the direction of air flow depends upon the orientation and positioning of cells 603 within the battery pack as it is important to maximize air flow during the discharge cycle in order to optimize battery performance.

In system 700, during a thermal runaway event a valve 707 opens up an air passageway 708 through barrier 703, thus allowing the hot gas and material generated during the event to flow through metal-air cells 603. In addition to opening passageway 707, preferably the passageways that control airflow into and out of the portion of pack 701 containing metal-air cells 603 are also adjusted, for example altering passageways 705 (e.g., using valves 706) to optimize the flow of hot gas from the non-metal-air cells through the metal-air cells. For example, in addition to opening passageway 707 of system 700 during thermal runaway of a non-metal-air cell, preferably passageway 607 is opened and passageways 705 are closed, thus directing the flow of hot gas and material from the non-metal-air cells through the metal-air cells before exiting the pack.

As previously noted, the present invention may be used in a variety of different system configurations. System 800, shown in FIG. 8, utilizes separate battery packs, i.e., metal-air battery pack 101 and conventional battery pack 103. Preferably, and as shown, a plenum 801 is used to direct the flow of air through metal-air cells 603. It should be understood, however, that other means may be used to direct the flow of air through cells 603, and that plenum 801 is not a requirement of the invention.

During normal operation, preferably non-metal-air battery pack 103 is closed as previously noted, and air is directed into plenum 801 via passageway 803, the flow through passageway 803 under the control of valve 804. After passing through the metal-air cells 603, the air leaves battery pack 101 via one or more passageways 805. The air flow through passageway 805 is preferably controlled by a valve 806. Once a non-metal-air cell 605 within battery pack 103 begins to overheat and enter into a thermal runaway condition, a valve 809 opens, allowing hot gas and material generated during the event to exit pack 103 via passageway 810 and enter duct 811. At approximately the same time, valve 804 closes and a valve 813 opens, valve 813 allowing the hot gas expelled from battery pack 103 to flow through duct 811 and into plenum 801 via passageway 814. Plenum 801 directs the flow through metal-air cells 803. Exemplary pathways 815 illustrate some of the flow pathways through passageway 814 and plenum 801.

Figure 9:
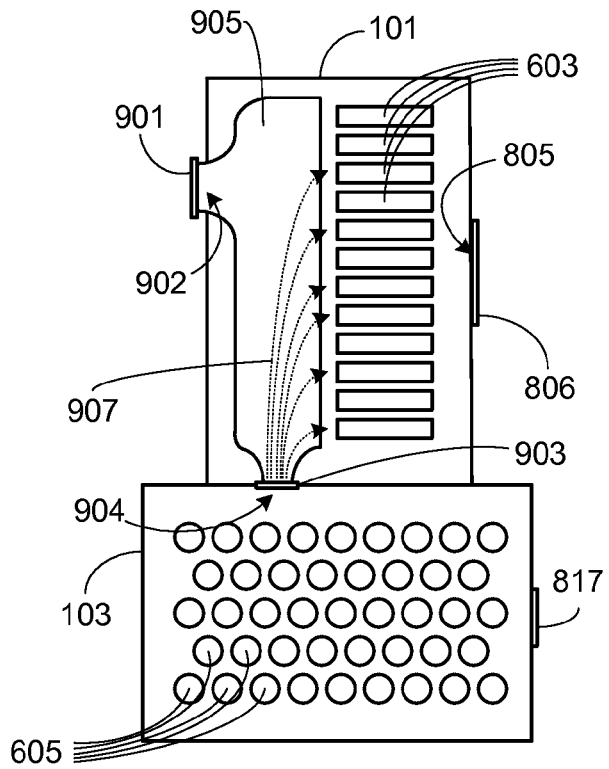
FIG. 9 illustrates a modification of the embodiment shown in FIG. 8 which allow the duct of the system shown in FIG. 8 to be minimized or eliminated.

In system 800, preferably the two battery packs are in close proximity to one another, thereby allowing the length of duct 811 to be minimized. In some configurations, duct 811 may be eliminated altogether. For example, FIG. 9 illustrates slight modification of system 800. As shown, battery packs 101 and 103 are adjacent to one another. In this embodiment, during a thermal event valve 901, controlling the flow of ambient (or other) air into plenum 903 via passageway 902, is closed and valve 903 is opened, thereby allowing the hot gas generated during the thermal event within pack 103 to pass through passageway 904 into plenum 905, and thus through metal-air cells 603 via exemplary pathways 907.

Figure 8:
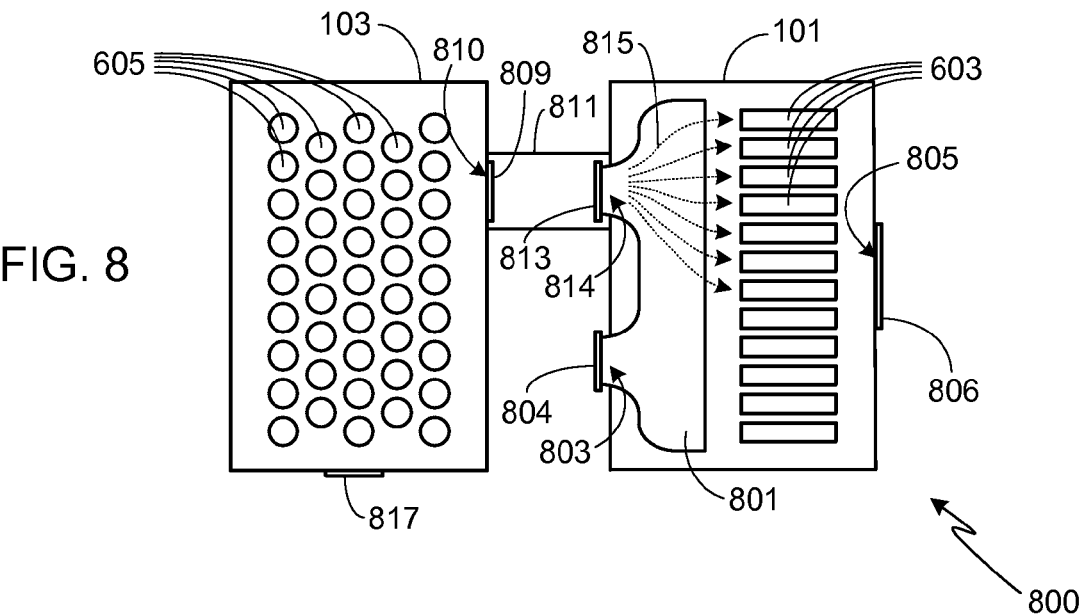
FIG. 8 illustrates an embodiment utilizing a metal-air battery pack and a conventional battery pack with a duct interposed between the two packs.

In the systems illustrated in FIGS. 8 and 9, if the valve 806 controlling passageway 805 is closed, the hot gas and material from pack 101 will flow into pack 103 until a pressure equilibrium is reached between the packs. The hot gas and material will then be contained within the packs until the thermal event is finished and the packs cool, or until there is a failure within one of the packs (e.g., at an enclosure joint or in a duct, seal, feed-through, valve, etc.). Given the volume of gas generated during a typical thermal runaway event, it will be appreciated that for most systems, maintaining a closed system is not a viable option. Accordingly, in a typical application, passageway 805 is only temporarily sealed, if sealed at all, during the initial stage of thermal runaway. At a predetermined pressure and/or temperature, valve 806 is opened, thus allowing the hot gas and material generated by the event and passing through the metal-air cells to exit the system. As noted above, for many applications the temperature of the hot gas will have been sufficiently reduced to significantly lower the risk of spontaneous combustion of materials in proximity to the expelled hot gas as well as the risks to vehicle occupants, first responders and bystanders.

In addition to operation of the valve controlling flow through passageway 805, and as noted in the above configurations, preferably battery pack 103 includes a secondary high pressure escape valve 817 that prevents the system from becoming over-pressurized once the pores within the porous metal electrodes of the metal-air cells become clogged. Valve 817 is designed to open at a predetermined pressure and/or temperature that is less than that which would cause the generation of a failure point in one of the packs, ducting, feed-through, seals, etc., but at a sufficiently high pressure, or temperature, to significantly delay the expulsion of hot gas from pack 101.

The present invention may be implemented either as a mechanical system in which the disclosed hazard mitigation system is automatically implemented by action of one or more valves, or as a smart system in which the valves are under the control of a control system that determines when to open and/or close the control valves. In the first configuration, valves may be used that are designed to open gradually, or completely, based on the pressure and/or temperature. In the second configuration, which is preferred, the valves controlling air flow through the battery packs are under the control of a system controller. Regardless of the technique used to control valve operation, it is important that the valve controlling the flow of hot gas out of the conventional battery pack (e.g., valve 301 in FIGS. 3-5; valve 707 in FIG. 7; valve 809 in FIG. 8; and valve 903 in FIG. 9) opens rapidly, preferably at the onset of a thermal event, thereby quickly mitigating the early effects of a cell undergoing thermal runaway and potentially preventing the initial thermal runaway event from spreading throughout the pack. A rapid response by the system can help contain the event, thus improving the safety to passengers, bystanders and first responders and lowering the risk of collateral damage.

FIGS. 10-13 illustrate the embodiments shown in FIGS. 6-9, modified to include a system controller 1001 that (i) determines whether a valve is to be opened or closed, and (ii) controls the opening/closing of the valves. As noted below, controller 1001 may be used to control all of the valves, or a subset of the valves. Controller 1001, which includes a processor and memory, may be a stand-alone controller or integrated within another vehicle control system.

Figure 6:
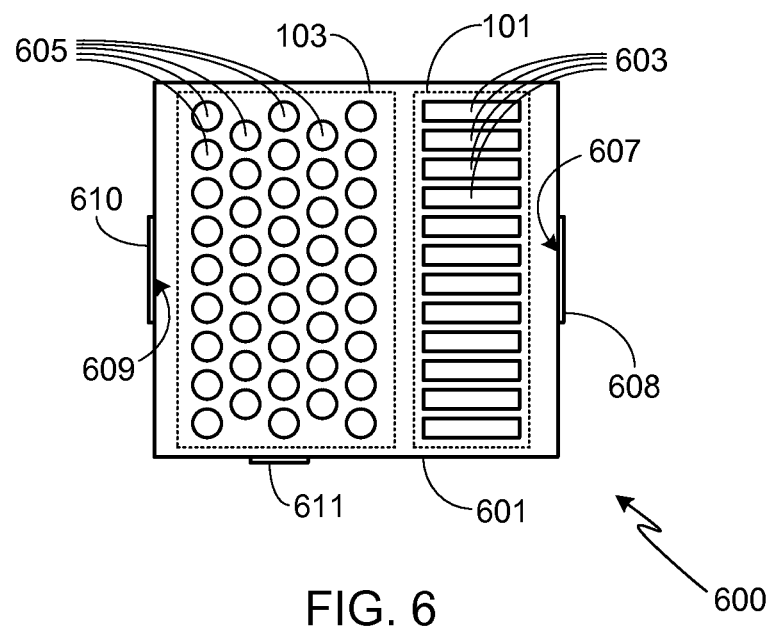
FIG. 6 illustrates an embodiment in which both non-metal-air cells and metal-air cells are contained within a single battery pack.
Figure 10:
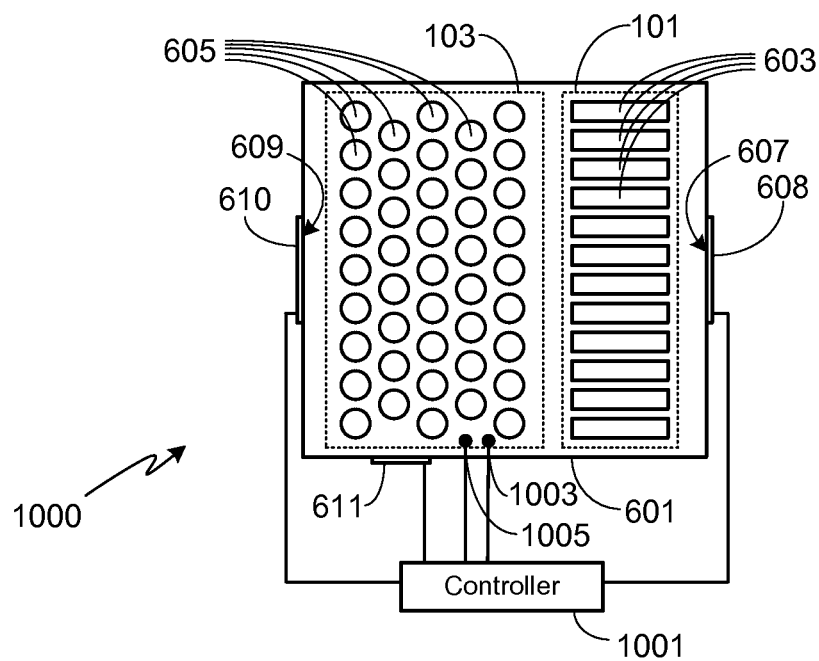
FIG. 10 illustrates a modification of the embodiment of FIG. 6 utilizing a system controller.

FIG. 10 corresponds to FIG. 6, with the addition of controller 1001. In this embodiment, system controller 1001 determines and controls the operation of valves 608 and 610. Thus, for example, if the metal-air cells 603 are in the discharge mode, controller 1001 opens valves 608 and 610 to ensure sufficient oxygen reaches the cells. Controller 1001 also monitors the pressure and/or temperature within pack 601 and compares the monitored pressure and/or temperature to a preset temperature and/or pressure, the preset values being stored within the controller's memory. FIG. 10 includes at least one pressure sensor 1003 and at least one temperature sensor 1005, although it will be appreciated that the system may monitor only pressure or only temperature, controlling the valves based on the monitored values. In system 1000, once controller 1001 determines that a thermal event is underway, either by determining that the pressure within pack 601 is greater than expected during normal operation or that the temperature within pack 601 is greater than expected during normal operation, valve 610 is closed, thereby forcing the hot gas and material generated by the thermal event to pass through metal-air cells 603 before being expelled through passageway 607. Assuming that the system includes a secondary pressure relief valve 611 as described above, preferably it is also under the control of controller 1001 as shown, although in at least one embodiment, valve 611 is a mechanical valve that operates independently of controller 1001. If valve 611 is under the control of controller 1001, as preferred, then controller 1001 opens valve 611 once the pressure within pack 601 exceeds a second preset value, indicating that the pores within the metal-air cells have become clogged from the material generated by the thermal event and that the pressure within the battery pack has exceeded the second preset value. Preferably the second preset value is less than the failure pressure of the pack.

Figure 11:
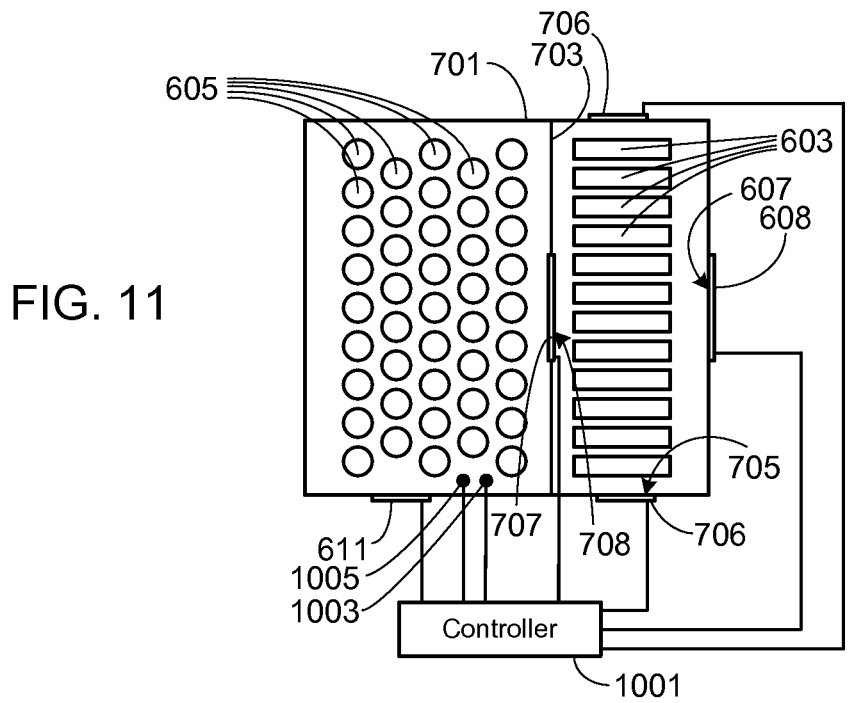
FIG. 11 illustrates a modification of the embodiment of FIG. 7 utilizing a system controller.

FIG. 11 corresponds to FIG. 7, with the inclusion of controller 1001. This system operates in a manner similar to that described previously, given the different valve arrangement. Thus, for example, during normal operation controller 1001 keeps valve 707 closed and valves 608 and 706 open to provide air flow for the metal-air cells. Once a thermal event is detected, controller 1001 opens valve 707 and closes valves 706, thereby forcing the hot gas and material generated by the thermal event to pass through metal-air cells 603 before being expelled through passageway 607.

Figure 12:
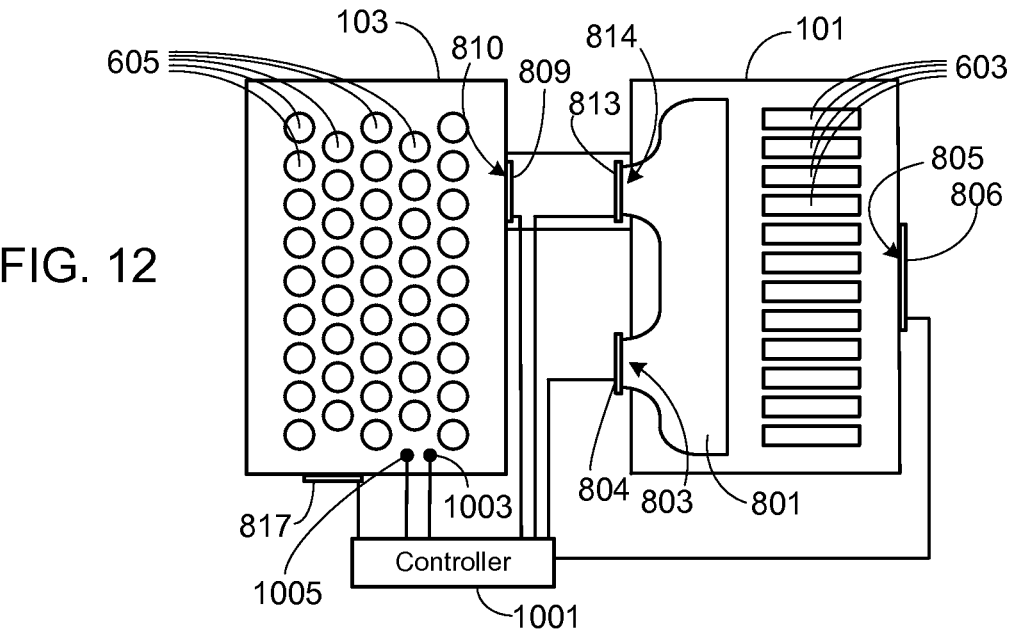
FIG. 12 illustrates a modification of the embodiment of FIG. 8 utilizing a system controller.

FIG. 12 corresponds to FIG. 8, with the inclusion of controller 1001. This system operates in a manner similar to that described previously, given the different valve arrangement. During normal operation controller 1001 keeps valves 809 and 813 closed, and valves 804 and 806 open, thus isolating the non-metal-air cells while providing air flow, and thus oxygen, to metal-air cells 603. When a thermal event is detected, controller 1001 opens valves 809 and 813, and closes valve 804, thereby forcing the hot gas and material generated by the thermal event to pass through metal-air cells 603 before being expelled through passageway 805. As in the embodiments shown in FIGS. 10 and 11, preferably secondary pressure relief valve 817 is under the control of controller 1001, valve 817 being opened when the air flow through the metal-air cells becomes too restrictive, causing the pressure within the conventional battery pack to increase to an undesirable level.

Figure 13:
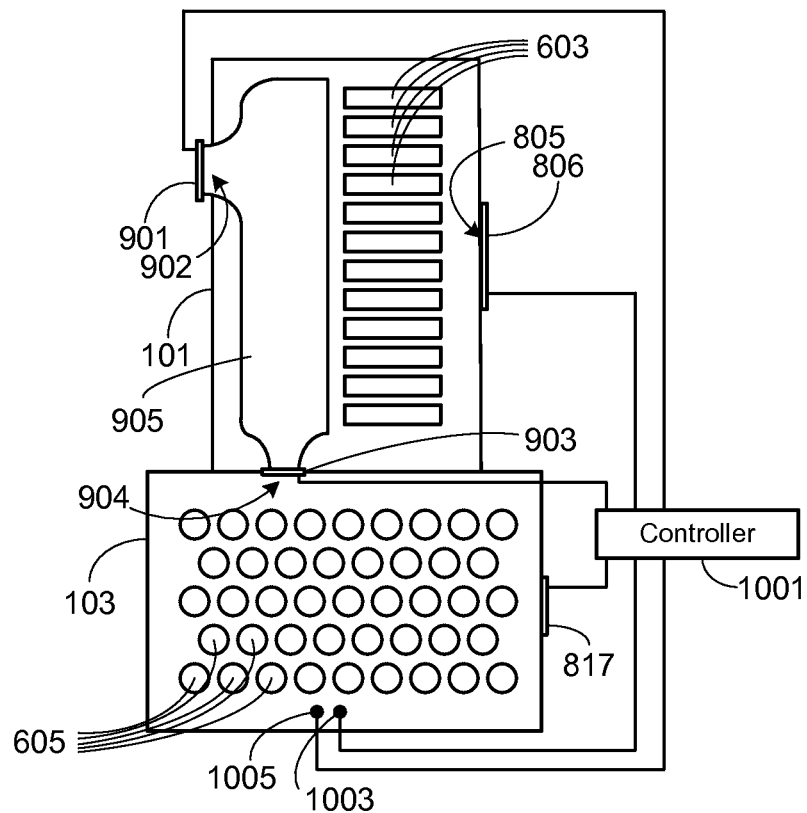
FIG. 13 illustrates a modification of the embodiment of FIG. 9 utilizing a system controller.

FIG. 13 corresponds to FIG. 9, with the inclusion of controller 1001. This system operates in a manner similar to that described previously, given the different valve arrangement. Thus, for example, during normal operation controller 1001 keeps valve 903 closed and valves 901 and 806 open. When a thermal event is detected, controller 1001 opens valve 903 and closes valve 901 in order to force the thermal event effluent to pass through the metal-air cells before being expelled through passageway 805.

Figure 14:
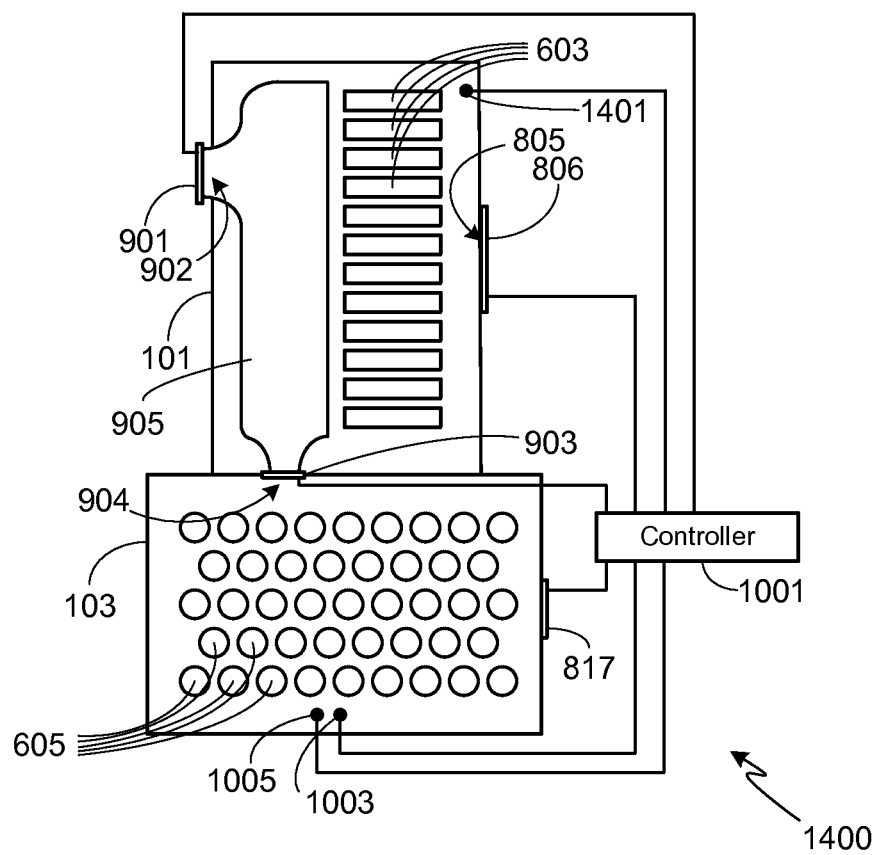
FIG. 14 illustrates a modification of the embodiment of FIG. 13 in which the system controller monitors pressure and/or temperature within the metal-air battery pack.

It will be appreciated that the invention may be incorporated into other configurations and embodiments than those shown and described above, and the illustrated configurations and embodiments are only meant to illustrate the primary aspects of the invention. For example, the metal-air battery pack may utilize more than the number of illustrated inlets in order to achieve the desired airflow during normal metal-air battery pack operation. To illustrate another variation of the invention, FIG. 14 shows a modification of the embodiment shown in FIG. 13. In system 1400, controller 1001 also monitors the pressure and/or temperature within metal-air battery pack 101 using sensor 1401. In one configuration, during the initial stages of a thermal event, controller 1001 closes valve 806, thus further delaying the expulsion of hot gas from the system. Once the pressure and/or temperature within battery pack 101 exceeds a preset value, or once the pressure within packs 101 and 103 equalize, controller 1001 opens valve 806. Alternately, controller 1001 may control the amount that valve 806 is opened based on the pressure within pack 101, for example just cracking valve 806 open during the initial stages of the thermal event, and then increasing air flow through passageway 805 as the pressure within pack 101 increases due to the escalation of the thermal event. The techniques illustrated in FIG. 14, i.e., monitoring conditions within the metal-air battery pack in order to further control air flow through the metal-air cells, may be used with any of the other configurations and embodiments of the invention.

It should also be understood that the invention may utilize any means to detect the occurrence of thermal runaway and initiate the disclosed mitigation procedures, i.e., flowing thermal event effluent through the metal-air cells. While pressure and/or temperature are routinely used to detect thermal events, other means may also be used, for example, monitoring the operational condition of the individual non-metal-air cells or groups of non-metal-air cells in order to detect short circuits or other non-standard operating conditions. Regardless of the means used to detect a thermal event, once such an event is detected, the system of the invention would alter the air flow, forcing the hot gas and material generated during the event to pass through the metal-air cells.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack with an integrated hazard mitigation system, comprising:
   a battery pack enclosure;
   a plurality of metal-air cells contained within said battery pack enclosure;
   a plurality of non-metal-air cells contained within said battery pack enclosure;
   a first air inlet providing a first air flow pathway into and out of said battery pack enclosure, wherein air entering said first air inlet flows through said plurality of non-metal air cells prior to flowing through said plurality of metal-air cells;
   a second air inlet providing a second air flow pathway into and out of said battery pack enclosure, wherein air entering said second air inlet flows through said plurality of metal-air cells without first flowing through said plurality of non-metal air cells;
   a first valve coupled to said first air inlet, wherein said first valve controls air flow through said first air inlet;
   at least one temperature sensor within said battery pack enclosure;
   a system controller coupled to said first valve and to said at least one temperature sensor, wherein said system controller is programmed to determine if a temperature monitored by said at least one temperature sensor is indicative of at least one of said plurality of non-metal-air cells entering into thermal runaway, and wherein if said temperature monitored by said at least one temperature sensor is indicative of at least one of said plurality of non-metal-air cells entering into thermal runaway said system controller is further programmed to close said first valve, wherein closing said first valve closes said first air inlet and forces effluent generated during said thermal runaway of at least one of said plurality of non-metal-air cells to pass through said plurality of metal-air cells before being expelled through said second air inlet.

2. The battery pack of claim 1, wherein said system controller is programmed to compare said temperature to a preset temperature, wherein said preset temperature is indicative of at least one of said plurality of non-metal-air cells entering into thermal runaway.

3. The hazard mitigation system of claim 1, further comprising a high pressure relief valve coupled to said battery pack enclosure.

4. The hazard mitigation system of claim 1, further comprising a second valve coupled to said second air inlet, wherein said second valve controls air flow through said second air inlet, and wherein said system controller is further programmed to temporarily close said second valve when said temperature monitored by said at least one temperature sensor is indicative of at least one of said plurality of non-metal-air cells entering into thermal runaway.

* * * * *